United States Patent
Ladhari et al.

(10) Patent No.: US 11,792,621 B1
(45) Date of Patent: Oct. 17, 2023

(54) MANAGEMENT OF INTERFERENCE ON A V2X CHANNEL, BY DISABLING A FUNCTION ON A VEHICLE

(71) Applicant: PSA AUTOMOBILES SA, Poissy (FR)

(72) Inventors: Fadi Ladhari, Le Kremlin Bicetre (FR); Trista Lin, Villemeux sur Eure (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 18/253,532

(22) PCT Filed: Oct. 21, 2021

(86) PCT No.: PCT/FR2021/051843
§ 371 (c)(1),
(2) Date: May 18, 2023

(87) PCT Pub. No.: WO2022/112673
PCT Pub. Date: Jun. 2, 2022

(30) Foreign Application Priority Data

Nov. 30, 2020 (FR) ...................................... 2012355

(51) Int. Cl.
*H04W 4/40* (2018.01)

(52) U.S. Cl.
CPC .................................... *H04W 4/40* (2018.02)

(58) Field of Classification Search
CPC ................................................. H04W 4/40–48
See application file for complete search history.

(56) References Cited

U.S. PATENT DOCUMENTS

| | | | |
|---|---|---|---|
| 10,582,351 B2* | 3/2020 | Surnilla | H04W 8/183 |
| 11,381,943 B2* | 7/2022 | Chen | G08G 1/163 |
| 2018/0192266 A1 | 7/2018 | Park et al. | |

FOREIGN PATENT DOCUMENTS

WO  2020194446 A1  10/2020

OTHER PUBLICATIONS

International Search Report for corresponding PCT/FR2021/051843 dated Feb. 1, 2022.
Written Opinion for corresponding PCT/FR2021/051843 dated Feb. 1, 2022.

* cited by examiner

*Primary Examiner* — Thomas R Cairns
(74) *Attorney, Agent, or Firm* — Sandberg Phoenix & von Gontard PC

(57) ABSTRACT

The invention relates to the management of interference related to the use of a single vehicle-to-everything short-range communication channel, referred to as a V2X channel, by a user terminal (UE) and by a land-based motor vehicle (Veh), by disabling a function of the V2X channel on the vehicle.

9 Claims, 5 Drawing Sheets

MANAGEMENT OF INTERFERENCE ON A V2X CHANNEL, BY DISABLING A FUNCTION ON A VEHICLE

CROSS-REFERENCE TO RELATED APPLICATIONS

This application is the US National Stage under 35 USC § 371 of International Application No. PCT/FR2021/051843, filed Oct. 21, 2021, which claims the priority of French application 2012355 filed on Nov. 30, 2020, the content (text, drawings and claims) of both said applications being incorporated by reference herein

TECHNICAL FIELD

The methods and devices disclosed herein relate to the field of wireless communication networks used by a land-based motor vehicle. In particular, they relate to the management of interference on a V2X channel between a user terminal and a vehicle.

What is meant by "land motor vehicle" is any type of vehicle such as an automobile, a moped, a motorcycle, a warehouse robot, etc.

SUMMARY

New wireless telecommunications standards include specifications dedicated to motor vehicle applications. Thus, vehicle-to-everything short-range wireless communication channels, referred to as V2X channels, have been specified.

A first type of V2X channel is based on the Wi-Fi® standards (IEEE 802.11p) and supports communications between vehicles and between vehicles and infrastructures.

A second type of V2X channel is based on cellular standards, and especially on the 5G standard. This second type of V2X channel supports communications between vehicles, between vehicles and infrastructures or else between a vehicle and a cellular network. Since this type of channel exists in parallel with conventional cellular channels, it is especially referred to as "sidelink", or else "PC5" and is subject to C-V2X standards.

V2X communications can also be implemented by a user terminal.

What is meant by "user terminal" is any electronic device of a user. A smartphone, a tablet, a laptop computer or any type of connected object such as a watch, earphones or glasses are examples of user terminals.

Also, when a vehicle is in operation, it is likely that several V2X antennas communicate over a single V2X channel. These simultaneous communications are not desirable.

Indeed, time-slot division is provided on a V2X channel. In particular, the channel is busy when one of the V2X terminals sends a V2X packet. Also, if two terminals transmit at the same time, interference occurs and the time slot is lost.

In particular, one of the problems related to such interference is described with reference to FIG. 2.

In FIG. 2, a user terminal UE is present inside a vehicle Veh. Moreover, a second user terminal UEs1, a third user terminal UEs2, and a second vehicle Vehs1 are within communication range for the V2X channel. Further, a third vehicle Vehs2 inside which a fourth user terminal UEs3 is present is also within communication range for the V2X channel.

For each of the entities (vehicles and user terminals), a time axis is depicted. On each of these axes, the entity transmits (TX boxes), receives (RX boxes) or is inactive pending reception (CS boxes). Hereinafter, a slot is understood to mean a transmission or reception box, and the axes therefore comprise five slots in FIG. 2 (the first slot is on the left and the fifth is on the right).

In the first slot, UE transmits over the V2X channel. The transmitted packet is received by all the entities listening to the V2X channel, and therefore especially twice at the reference 46 by an occupant of the vehicle Vehs2 (on the vehicle and on the terminal UEs3). Likewise, at the second slot, where the reception is unnecessarily duplicated at the references 40 and 48, and at the third slot, where the reception is unnecessarily duplicated at the reference 50.

In the fourth slot, at the reference 44, the terminal UEs1 and the vehicle Vehs1 transmit at the same time over the V2X channel, which generates unsurmountable interference on the V2X channel and therefore the loss of the slot (no entity can receive anything on this slot). Likewise at the fifth slot, a transmission conflict occurs at the vehicle Veh and the terminal UE, reference 42.

The present methods and devices improve the situation.

For this purpose, a first aspect of the present disclosure relates to a method for the management of interference related to the use of a single vehicle-to-everything short-range communication channel, referred to as a V2X channel, by a user terminal and by a land-based motor vehicle, the method including, at the vehicle, the steps of:
  identifying the presence of the user terminal inside the vehicle and a capability of the user terminal to communicate over the V2X channel;
  transmitting to the identified user terminal a request to disable on the user terminal at least one communication function based on the V2X channel;
  on receipt of a refusal to disable the function from the user terminal, disabling on the vehicle at least one second communication function based on the V2X channel.

A simple and effective method for reducing interference on the V2X channel is thus implemented. Indeed, the number of processing steps is reduced and does not involve any signal-processing method usually implemented to limit interference.

The user of the user terminal may still want to benefit from the V2X channel directly on their terminal. The method makes this possible while dealing with the interference problems detailed hereinbefore in FIG. 2.

What is meant by "single vehicle-to-everything short-range communication channel" is a single way to communicate according to a V2X protocol (for example IEEE 802.11p or Sidelink PC5). All communications according to this manner of communicating and capable of generating interference are thus exchanged herein over the single V2X channel. Thus, two communications can be made over the single V2X channel even if parameters, such as specific physical parameters of the radiofrequency signal (modulation, polarization, etc.), differ between the two communications.

In one embodiment, the communication function and the second communication function are identical.

In another embodiment, the method further includes, after the disabling step, the steps of:
  detecting a departure of the user terminal from inside the vehicle;
  upon detecting the departure, re-enabling the second communication function based on the V2X channel.

In another embodiment, the V2X channel is configured to provide a service to the user, the method further including the steps of:

receiving data relating to the service from the user terminal, the data having been received by the V2X channel of the user terminal;

duplicating the service on an infotainment system of the vehicle.

In particular, in another embodiment, the duplication of the service is based on a secondary channel, the secondary channel being one of the following channels:

a wired channel according to a USB-type (Universal Serial Bus) protocol;

a short-range wireless channel according to a Wi-Fi®-type protocol;

a short-range wireless channel according to a Bluetooth®-type protocol.

A user terminal connected to such a secondary channel implies that it is in the vehicle. It is therefore easy and effective to identify the terminal.

In one embodiment, the V2X channel operates according to at least one of the following protocols:

3GPP C-V2X with a PC5 interface;

802.11p.

A second aspect of the present disclosure relates to a computer program comprising instructions for implementing the method according to the first aspect of the present disclosure, when these instructions are executed by a processor.

A third aspect of the present disclosure relates to a device for management of interference related to the use of the single vehicle-to-everything short-range communication channel, referred to as a V2X channel, by a user terminal and by a land-based motor vehicle, the device being configured to be comprised in the vehicle and including at least one memory and at least one processor arranged to perform the operations of:

identifying the presence of the user terminal inside the vehicle and a capability of the user terminal to communicate over the V2X channel;

transmitting to the identified user terminal a request to disable on the user terminal at least one first communication function based on the V2X channel;

on receipt of a refusal to disable the first function from the user terminal, disabling on the vehicle at least one second communication function based on the V2X channel.

A fourth aspect of the present disclosure relates to a vehicle configured to comprise the device according to the third aspect of the present disclosure.

Other features and advantages of the present disclosure will become apparent from examining the detailed description hereinafter, and the appended drawings.

DETAILED DESCRIPTION

The disclosed methods and devices are described hereinafter in their non-limiting application to the case of a motor vehicle comprising a connectivity box and infotainment system (disclosed hereunder) and inside of which a user terminal is present. Such an application is purely illustrative and limited to a few components (connectivity box and infotainment system) for the sake of clarity but, in practice, the methods and devices can be used by several tens or hundreds of components, interfaces linked to the connectivity box and infotainment system in particular, that are present in the vehicle. Furthermore, the methods and devices can be implemented on any type of land motor vehicle such as a motorcycle, a coach or even a robot in a factory.

Figure 1:
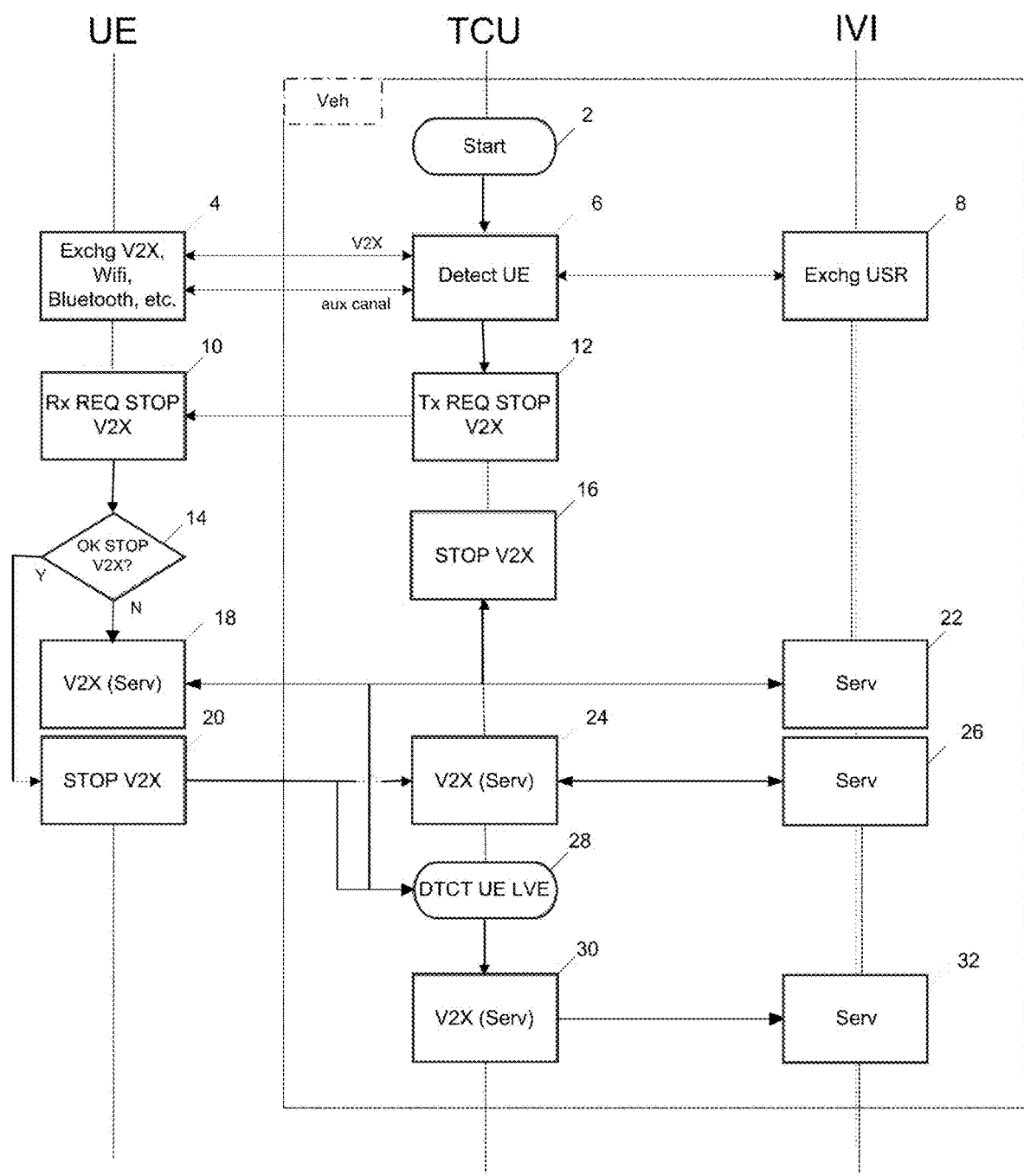
FIG. 1 is a diagram illustrating the steps of a method according to one embodiment.

FIG. 1 illustrates a method according to one embodiment of the method.

FIG. 1 includes the steps of the method, implemented at a user terminal UE (on the left), at a connectivity box TCU (in the center) and at an infotainment system IVI (on the right).

The TCU and the IVI are comprised in a vehicle Veh.

The connectivity box TCU is especially in charge of data exchanges by the airwaves (radiofrequency link) with terminals not comprised in the vehicle. In this regard, it typically includes antennas, processors, memories and other components responsible for the processing of the signals exchanged by air.

The protocols supported by the connectivity box are, for example, cellular protocols (3G, 4G, 5G, etc.) or short-range protocols (Wi-Fi®, Bluetooth®, LoRa®, etc.). The connectivity box is further able to communicate over the internal networks of the vehicle, for example via the Ethernet or CAN (Controller Area Network) protocol. It therefore comprises especially components in charge of communications over the V2X channel.

The infotainment system IVI is especially responsible for services intended for occupants of the vehicle. These services include the broadcasting, for example, of audio content via loudspeakers and video/image contents on one or more screens, tactile or not. The infotainment system is connected to the other components of the vehicle by internal networks of the vehicle, for example via the Ethernet or CAN (Controller Area Network) protocol. The infotainment system can also communicate directly with a user terminal (smartphone for example) using radiofrequency (Bluetooth® or Wi-Fi® for example) or wired (USB for example) protocols.

One example of a service made available to an occupant of the vehicle by the infotainment system is the generation of alerts relating to the environment of the vehicle, for example the display of an alert of the presence of another vehicle, exchanging over the V2X channel, hidden by an obstacle and likely to be found in the trajectory of the vehicle, or the display of an alert relating to vehicles that are stopped around a bend.

In step 2, the method begins. The method is for example implemented upon starting the vehicle, that is to say, when the vehicle is unlocked by a key, for example via a user terminal, or when an engine of the vehicle is started.

In a step 6, a step of identifying the presence of the user terminal inside the vehicle and a capacity of the user terminal to communicate over the V2X channel is implemented.

In particular, in one embodiment, the identification of the presence of the user terminal includes the sub-step of:
receiving information entered in a step 8 by an occupant of the vehicle via an infotainment system of the vehicle, the information:
indicating the presence of the user terminal inside the vehicle; and
including data configured to establish communication between the user terminal and the vehicle.

In particular, the data configured to establish communication between the user terminal and the vehicle are, for example, at least one element from among a name of the terminal, a V2X protocol version, an address (MAC, email, etc.) of the terminal, etc.

In another embodiment, the identification of the presence of the user terminal includes a detection in a step 4 of a connection based on a secondary channel, aux channel, between the user terminal and the vehicle.

In particular, the secondary channel is at least one of the following channels:
a wired channel according to a USB-type (Universal Serial Bus) protocol;
a short-range wireless channel according to a Wi-Fi®-type protocol;
a short-range wireless channel according to a Bluetooth®-type protocol.

In particular, the identification of the terminal and of the fact that it is likely to exchange over the V2X channel is carried out using the data exchanged over the auxiliary channel. For example, a request can be transmitted over the secondary channel by the TCU to request, from the terminal, clarifications about the possibility of the terminal exchanging over the V2X channel and information relating to the connection of the terminal to the V2X channel (addresses, modulation, etc.).

In another embodiment, the identification of the presence of the user terminal includes the sub-steps of:
receiving a message from the user terminal transmitted over the V2X channel;
extracting location information and/or time-stamp information from the received message;
identifying the presence of the user terminal from the extracted information.

Unlike the use of the secondary channel, dedicated to the vehicle, the V2X channel alone is not specific to the vehicle and it is therefore necessary to discriminate the user terminals in the vicinity of the vehicle (typically pedestrian), which are to be listened to, from those within the vehicle, which are to be discriminated. Thus, geolocation and/or time-stamp information is used. Indeed, the V2X channel can give precise position information at a given time and the vehicle can therefore know whether the user terminal is inside the vehicle.

In a step 12, a request to disable on the user terminal at least one communication function based on the V2X channel is transmitted to the identified user terminal.

In a main embodiment, the communication function is a transmission function. Thus, the user terminal is requested to stop transmitting so as to avoid transmitting duplicates on the same slot, see also FIG. 4 hereunder. A transmission function to be disabled may be limited to a particular aspect, for example to a transmission on a particular frequency band, with the terminal continuing to transmit over another frequency band.

In another embodiment, the complete disabling of the communication capabilities on the V2X channel of the user terminal is requested.

In a step 10, the disabling request is received by the user terminal and a decision is taken in a step 14 concerning this request.

In particular, the request can be submitted directly to a user of the user terminal UE. For example, an alert, as a notification or a pop-up, can be generated on UE. The user can then validate the disabling proposal directly, or disable the V2X function by themselves (for example, in the drop-down settings menu on the touch screen of a smartphone).

The request can also be processed automatically by the user terminal, for example by means of a configuration pre-recorded by the user or factory.

In the case where the user terminal refuses the disabling, in a step 18, the V2X channel continues to be used by the user terminal UE.

In particular, the V2X channel continues to be used by UE to execute a service, as presented hereinbefore, intended for the user, for example a driver of the vehicle. In this situation, the execution of the service can continue via UE, without involving the vehicle, and especially its V2X connection via the TCU. Thus, in a step 16, upon receiving a refusal to disable the function from the user terminal, at least one second communication function based on the V2X channel is disabled on the vehicle.

In one embodiment, the communication function and the second communication function are identical. That is to say that there is only one communication function to be enabled/disabled according to the method. In particular, the communication function is a transmission function over the V2X channel or complete disabling of the V2X channel.

Thus, the TCU disables, at least for the transmission, its V2X channel in order to avoid interference over this V2X channel with UE.

In order for the vehicle, especially via the infotainment system IVI, to continue to benefit from the service received by the UE's V2X channel, the service is duplicated on IVI in a step 22. Such a duplication is, for example, carried out by known methods for minoring from UE to IVI.

In one embodiment, the duplication of the service is based on a secondary channel, the secondary channel being one of the following channels:
a wired channel according to a USB-type (Universal Serial Bus) protocol;
a short-range wireless channel according to a Wi-Fi®-type protocol;
a short-range wireless channel according to a Bluetooth®-type protocol.

In the case where UE accepts the disabling of the function, the vehicle takes over the communication function over the V2X channel in a step 24.

In particular, in the main embodiment, the communication function is all of the communication, transmission and reception functions, over the V2X channel. Indeed, in this embodiment, UE can continue to listen but stops transmitting, the transmission functions then being provided by TCU.

In the case where UE accepts disabling the function, TCU exchanges over the V2X channel in order to provide the service. Also, TCU receives data relating to the service via the V2X channel and transfers it to IVI so that, in a step 26, the service is actually made available via IVI.

In a step 28, whether it is the UE or the TCU that facilitates the exchanges, especially for the provision of the service, with the V2X channel, a detection of a departure of the user terminal from inside the vehicle occurs.

According to the identification mode of the terminal in the vehicle, especially in step 6, the detection of the departure is implemented accordingly. In particular, if a disconnection of the secondary channel occurs, if the user indicates their departure on IVI, or even if a halting of a function of the vehicle (switching off the engine, for example) is detected, the departure is detected.

Upon detection of the departure, re-enabling on the vehicle the communication function based on the V2X channel occurs in a step 30. In one embodiment, the service can then be made available to the user via IVI in a step 32.

The departure of the user terminal does not necessarily mean a departure of the user from the vehicle and/or a decreased interest in maintaining exchanges over the V2X channel. The user may want to disconnect the secondary channel (for example, to avoid UE energy expenditure, for example by leaving Bluetooth® enabled) while continuing to benefit from the service. Furthermore, even in the case where the user actually leaves the vehicle, it may be relevant to maintain the V2X exchanges and/or the service (autonomous vehicle with no occupant, exchanges related to the safety of a parked vehicle, etc.).

Figure 3:
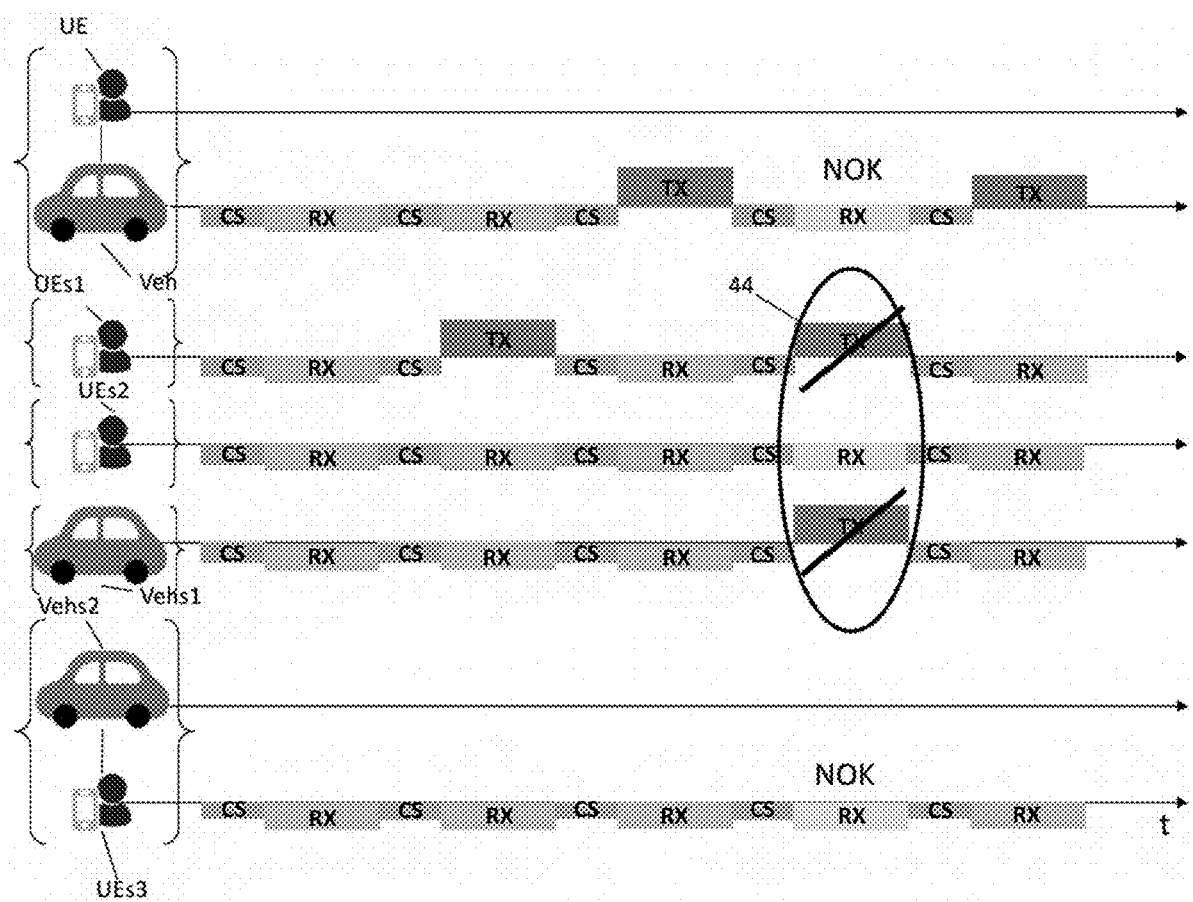
FIG. 3 is a diagram illustrating time aspects of the method according to one embodiment in a second situation.
Figure 4:
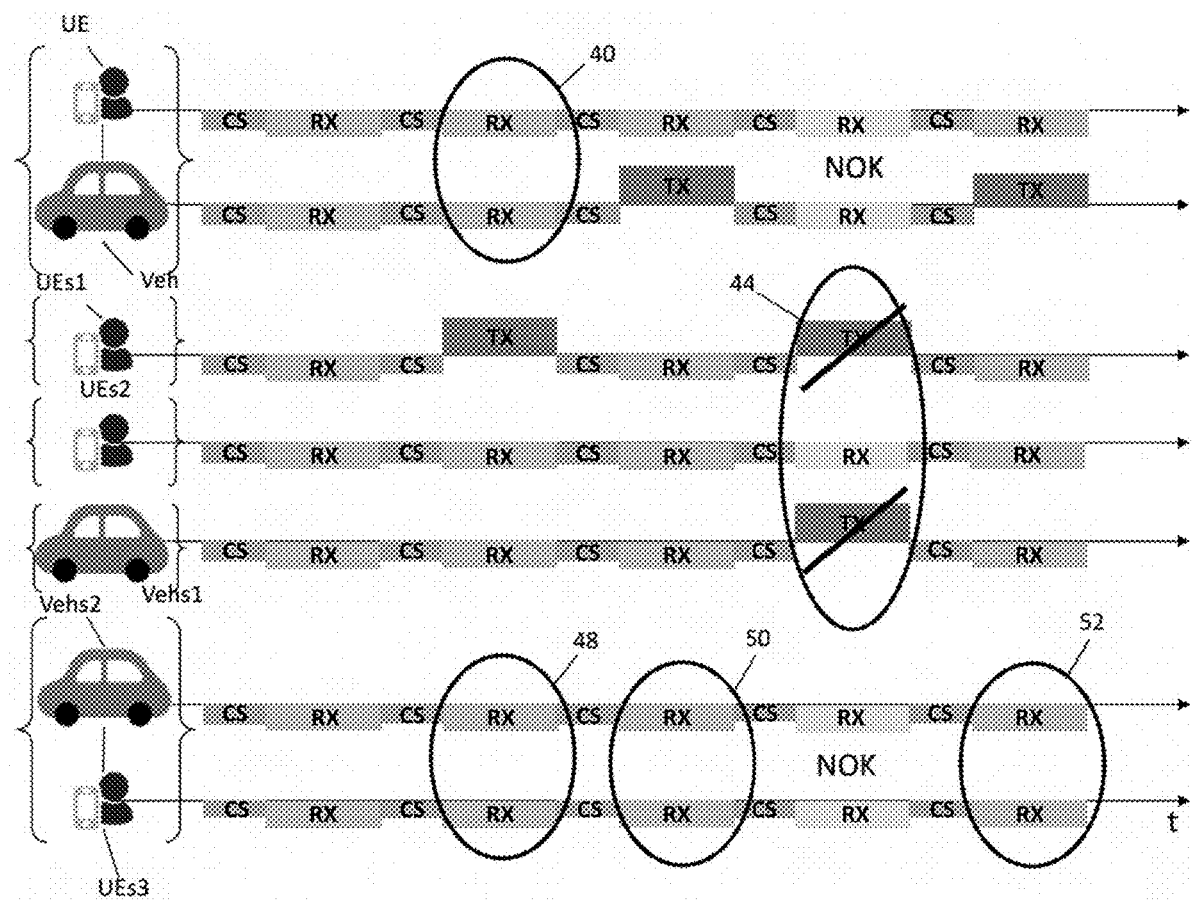
FIG. 4 is a diagram illustrating time aspects of the method according to one embodiment in a third situation.

FIG. 3 illustrates the time aspects of the method disclosed hereinbefore referring to FIG. 1, for the embodiment wherein the communication function to be disabled is both a transmission and a reception based on the V2X channel. FIG. 4 illustrates the main embodiment wherein only the transmission function is to be disabled.

Figure 2:
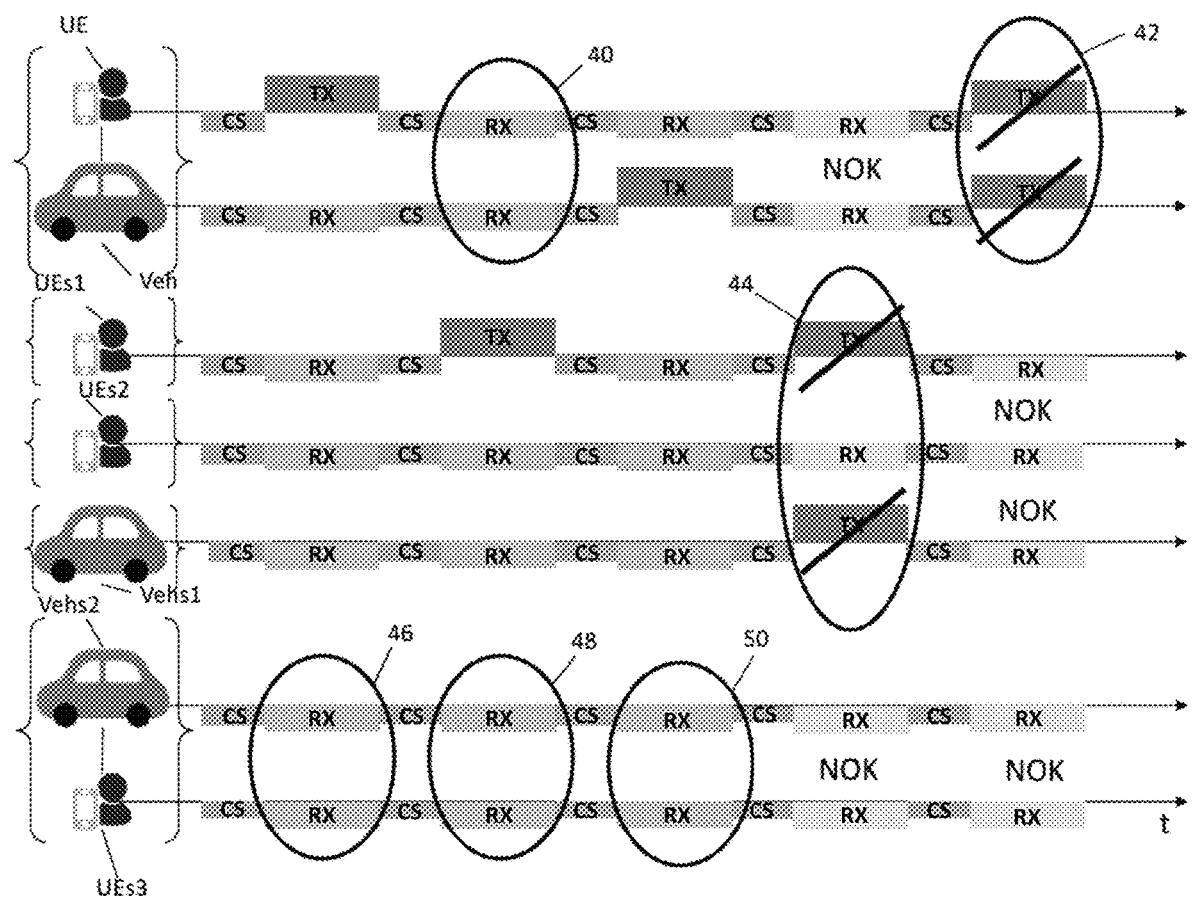
FIG. 2 is a diagram illustrating time aspects of a V2X exchange in a first situation.

The notations used in FIG. 3 are those disclosed hereinbefore for FIG. 2.

The first group of entities (user terminal or vehicle) comprising UE and Veh illustrates the situation wherein UE has accepted to disable the communication function based on the V2X channel. In particular, the communication function herein corresponds to any exchange over the channel (transmission and reception). Also, the vehicle Veh alone transmits and receives; especially it transmits in slots 3 and 5.

The first group may not receive, NOK, in slot four due to the duplication of transmission by UEs1 and Vehs1 (see hereunder). Nevertheless, with respect to the situation disclosed in FIG. 2, there is no duplication of reception in slot 2. Above all, with respect to the situation disclosed in FIG. 2, there is no duplication of transmission in slot 5 and therefore this slot is no longer lost.

Since UEs1, UEs2 and Vehs1 are not in a single vehicle, the method disclosed in FIG. 1 is not implemented. Therefore, the duplication of transmission 44 in slot 4 persists and, like in FIG. 2, slot 4 is lost.

The second group of entities comprising UEs3 and Vehs3 illustrates the situation wherein UE has refused to disable the communication function based on the V2X channel, and therefore facilitates exchanges over the V2X channel. In this case, with respect to FIG. 1, the duplication of reception is avoided in slots 1 to 3. Further, the reception indeed takes place in slot 5 due to the absence of duplication of the transmission by the first group. Nevertheless, like the first group, the second group may not receive, NOK, in slot four due to the duplication of emission by UEs1 and Vehs1.

In FIG. 4, the main embodiment disclosed above in FIG. 1 is implemented and only the transmission function is disabled. Thus, the slot 5 is not lost and there is no duplication of transmission between UE and Veh. Nevertheless, the duplications of reception 40, 48 and 50 always occur but do not involve total loss of a time slot.

With respect to FIG. 2, a new duplication of reception, without slot loss, occurs at 52.

Figure 5:
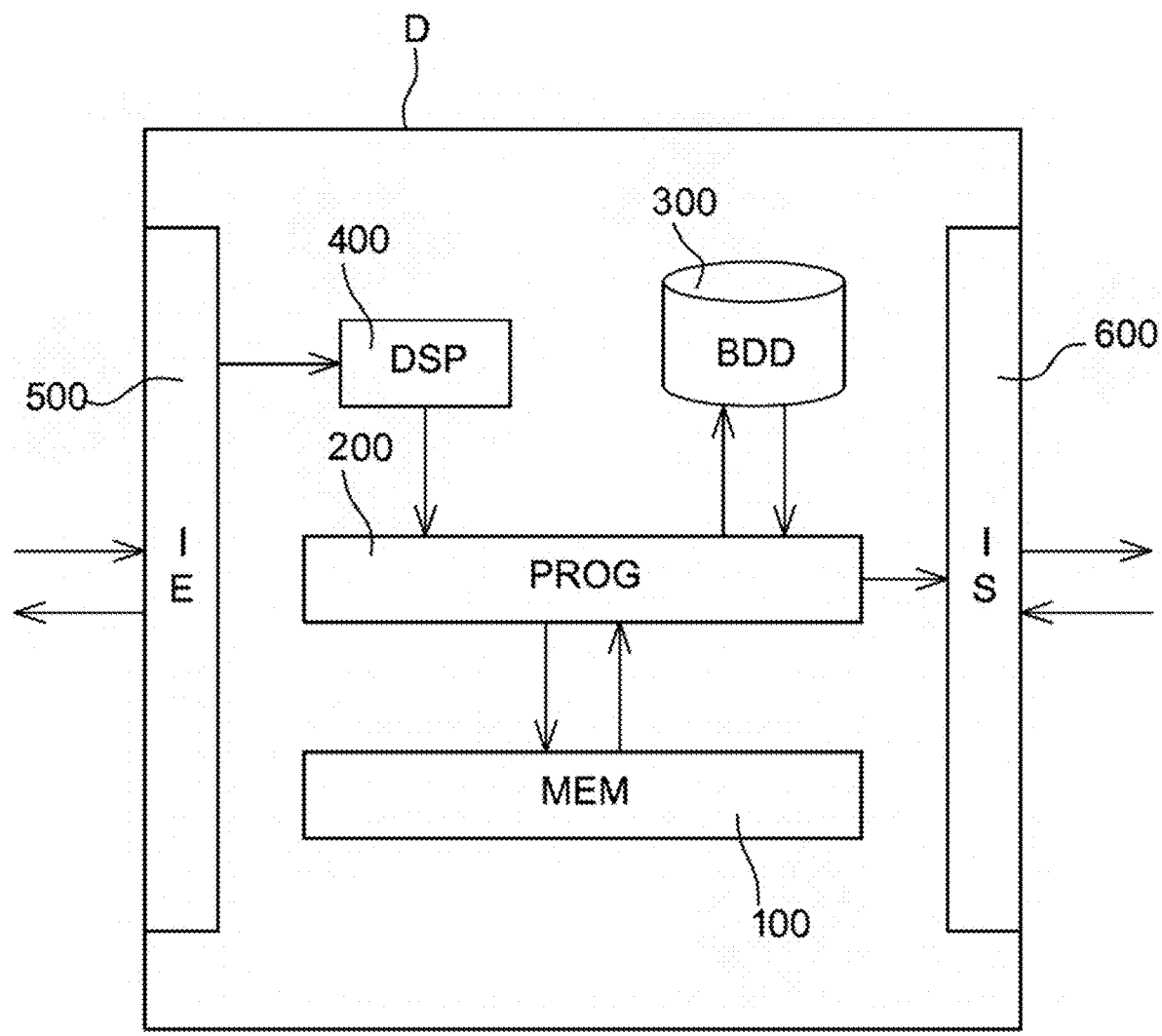
FIG. 5 illustrates the structure of a device according to one embodiment.

FIG. 5 depicts an example of a device D which comprises implementing at least some of the steps of the method disclosed hereinbefore referring to FIG. 1. In particular, the device D is comprised in TCU and/or IVI. The device D is comprised in the vehicle Veh.

This device D may take the form of a housing comprising printed circuits, any type of computer or else a smartphone.

The device D comprises a random-access memory 100 for storing instructions for the implementation by a processor 200 of at least one step of the methods as described above. The device also comprises mass storage 300 for storing data that are intended to be kept after the implementation of the method.

The device D may further comprise a digital signal processor (DSP) 400. This DSP 400 receives data for shaping, demodulating and amplifying these data in a manner known per se.

The device also comprises an input interface 500 for receiving the data implemented by methods according to the present disclosure and an output interface 600 for transmitting the data implemented by the method.

The present disclosure is not limited to the embodiments described above by way of example; it extends to other variants.

Thus, an embodiment has been disclosed which corresponds to an illustrative electronic architecture (a component TCU, a system IVI, etc.) for a motor vehicle. The present disclosure is also applicable to other electronic architectures (several TCUs or IVIs, etc.).

The invention claimed is:

1. A method for the management of interference related to the use of a single vehicle-to-everything short-range communication channel, referred to as a V2X channel, by a user terminal and by a land-based motor vehicle, the method including, at the vehicle, the steps of:
   identifying the presence of the user terminal inside the vehicle and a capability of the user terminal to communicate over the V2X channel;
   transmitting to the identified user terminal a request to disable on the user terminal at least one communication function based on the V2X channel;
   on receipt of a refusal to disable the function from the user terminal, disabling on the vehicle at least one second communication function based on the V2X channel.

2. The method according to claim 1, wherein the communication function and the second communication function are identical.

3. The method according to claim 1, further including, after the disabling step, the steps of:
   detecting a departure of the user terminal from inside the vehicle;
   upon detecting the departure, re-enabling the second communication function based on the V2X channel.

4. The method according to claim 1, wherein the V2X channel is configured to provide a service to the user, the method further including the steps of:
   receiving data relating to the service from the user terminal, the data having been received by the V2X channel of the user terminal;
   duplicating the service on an infotainment system of the vehicle.

5. The method according to claim 4, wherein the duplication of the service is based on a secondary channel, the secondary channel being one of the following channels:
   a wired channel according to a USB (Universal Serial Bus) protocol;
   a short-range wireless channel according to a Wi-Fi® protocol;

a short-range wireless channel according to a Bluetooth® protocol.

6. The method according to claim 1 wherein the V2X channel operates according to at least one of the following protocols:
3GPP cellular-V2X (C-V2X) with a PC5 interface;
IEEE 802.11p.

7. A non-transitory computer-readable medium including instructions for implementing the method according to claim 1, when these instructions are executed by a processor.

8. A device for the management of interference related to the use of a single vehicle-to-everything short-range communication channel, referred to as a V2X channel, by a user terminal and by a land-based motor vehicle, the device being configured to be comprised in the vehicle and including at least one memory and at least one processor arranged to perform the operations of:
  identifying the presence of the user terminal inside the vehicle and a capability of the user terminal to communicate over the V2X channel;
  transmitting to the identified user terminal a request to disable on the user terminal at least one first communication function based on the V2X channel;
  on receipt of a refusal to disable the first function from the user terminal, disabling on the vehicle at least one second communication function based on the V2X channel.

9. A land-based motor vehicle (Veh) including the device according to claim 8.

* * * * *